(12) United States Patent
Nardi (10) Patent No.: US 12,485,266 B1
(45) Date of Patent: Dec. 2, 2025

(54) CATHETER SLIDE VALVE DEVICE

(71) Applicant: Stephen Nardi, Anthem, AZ (US)

(72) Inventor: Stephen Nardi, Anthem, AZ (US)

( * ) Notice: Subject to any disclaimer, the term of this patent is extended or adjusted under 35 U.S.C. 154(b) by 0 days.

(21) Appl. No.: 18/923,206

(22) Filed: Oct. 22, 2024

Related U.S. Application Data (60) Provisional application No. 63/546,893, filed on Nov. 1, 2023.

(51) Int. Cl.
*A61M 39/22* (2006.01)
*A61M 25/00* (2006.01)

(52) U.S. Cl.
CPC ...... *A61M 39/223* (2013.01); *A61M 25/0017* (2013.01); *A61M 2039/224* (2013.01); *A61M 2202/0014* (2013.01); *A61M 2202/0496* (2013.01); *A61M 2205/3331* (2013.01); *A61M 2205/582* (2013.01); *A61M 2205/584* (2013.01); *A61M 2209/088* (2013.01)

(58) Field of Classification Search
CPC .......... A61M 2039/224; A61M 39/223; A61M 2039/229
See application file for complete search history.

(56) References Cited

U.S. PATENT DOCUMENTS

| | | | |
|---|---|---|---|
| 3,529,599 A | 9/1970 | Folkman et al. | |
| 4,306,705 A | 12/1981 | Svensson | |
| 6,261,254 B1 | 7/2001 | Baron et al. | |
| 6,709,420 B1 | 3/2004 | Lincoln et al. | |
| 6,893,002 B2 * | 5/2005 | Brice | F16K 3/0209 251/327 |
| 8,292,858 B2 | 10/2012 | Burgess et al. | |
| 9,861,780 B2 | 1/2018 | Gonzalez | |
| D931,442 S | 9/2021 | Gajadhar | |
| 11,547,597 B2 | 1/2023 | Kobke | |

(Continued)

FOREIGN PATENT DOCUMENTS

GB 2620437 A * 1/2024 ............ A61M 39/10

OTHER PUBLICATIONS

Foley Catheters, Accessories, Catheter Valve, Flip-Flo™, 180° lever tap, bd.com. https://www.bd.com/en-us/products-and-solutions/products/product-page.bff5#overview [Date accessed: Jul. 19, 2023].

(Continued)

*Primary Examiner* — Courtney B Fredrickson
(74) *Attorney, Agent, or Firm* — Bold IP, PLLC; Binita J. Singh (57) ABSTRACT

A slide valve device for use with suprapubic catheters comprises a tube featuring a conically shaped inlet end that securely connects to an end of a catheter. An outlet end of the device has a diagonal cut for smooth fluid discharge. A valve mechanism includes a valve housing positioned perpendicularly on the tube and a slide valve equipped with an aperture. The aperture aligns with a through passage in the tube. The slide valve has a convex end and a concave end that provide tactile and visual cues for identifying open and closed positions. An attachment piece allows the device to be secured to the user's clothing, facilitating flexibility and comfort. The disclosed device aids in reducing risk of infection from a discharge end, provides better mobility to a person using the device, reduces the risk of spills, and eliminates splatter while discharging urine.

20 Claims, 7 Drawing Sheets

(56) References Cited

U.S. PATENT DOCUMENTS

| | | | |
|---|---|---|---|
| 11,583,429 B2 | 2/2023 | Norris | |
| 2007/0287953 A1* | 12/2007 | Ziv | A61M 39/223 137/605 |
| 2014/0107601 A1 | 4/2014 | Branch et al. | |
| 2022/0192859 A1 | 6/2022 | Su et al. | |
| 2023/0001152 A1* | 1/2023 | Luque González | A61M 25/0017 |
| 2024/0366913 A1* | 11/2024 | Luque González | A61M 25/0017 |

OTHER PUBLICATIONS

UROMED Catheter Valves, https://www.uromed.eu/ [Date accessed: Jul. 19, 2023].

Hollister Urinary Leg Bag Combination Pack, www.athomemedical. com. https://www.athomemedical.com/products/hollister-urinary-leg-bag-combination-pack?currency=USD&variant=31702918070351&utm_source=google&utm_medium=cpc&utm_campaign=Google%20Shopping&stkn=b8febb22d932&tw_source=google&tw_adid=&tw_campaign=17882224703&gad_source=1&gclid=Cj0KCQjw99e4BhDiARIsAISE7P8FaBFYGp6BLYJihgreWTi4cnayiwSQf8QTTANf_UcO8oJV-2y8aG8aAsLGEALw_wcB [Date accessed: Jul. 19, 2023].

* cited by examiner

CATHETER SLIDE VALVE DEVICE

CROSS-REFERENCE TO RELATED APPLICATIONS

This application is a non-provisional application which claims priority to U.S. Provisional Patent Application No. 63/546,893 filed on Nov. 1, 2023, which is incorporated by reference in its entirety.

TECHNICAL FIELD

The present invention relates to a catheter, more specifically to a urinary catheter which can control the flow of urine and be secured in a fixed position outside a user's body.

BACKGROUND

Urinating is a basic function that one must do several times a day. There are circumstances where one may be unable to urinate on their own. In such circumstances, a urinary catheter may be used to remove urine from a body. A urinary catheter is a tube placed in the body to drain and collect urine from the bladder. A urinary catheter may be used to empty the bladder before or after surgery. A urinary catheter is also used when people have difficulty urinating naturally.

There are at least three types of urinary catheters based on the approach of insertion and whether the catheter will be intermittent or indwelling. A suprapubic catheter is indwelling, or a long-term approach, which is inserted into the bladder surgically via a suprapubic approach. Essentially, the suprapubic catheter accesses the bladder from a small incision in the lower part of the abdomen, just above the pubic bone. The catheter is connected to a drainage bag and the urine flows into the bag via gravity. The current devices reduce mobility and social engagement. The weight of the drained urine causes the bag to slide down the leg and possibly separate from the catheter. Also, it becomes difficult to manage a drainage bag while exercising, traveling, or participating in any public engagement. The device with the connected bag can become uncomfortable and potentially embarrassing.

The suprapubic catheter can also be used without a drainage bag. Stopping urine discharge from a suprapubic catheter disconnected from a drainage bag involves a temporary solution. Usually, a drainage protector or catheter plug is used at the discharge end. When needed to discharge the urine from the bladder, the approach usually entails drainage directly into a container or collection device. However, the discharge end has a bell-shape causing urine to splatter when discharging. Some catheters may come with a clamp that can be used to stop urine flow. However, though the mechanism to open and close may be simple, the design is not intuitive as to when the opening in the clamp is open or closed. In such situations, urine may leak if the clamp mechanism is not in the closed position. There are other clamps that require a two-handed approach to open and close the clamp, and further, the mechanism is known to break and the design of the clamp does not indicate the open or closed position.

Accordingly, there exists a need for an improved device that allows a suprapubic catheter to be used without a drainage bag that offers an improved mechanism to discharge the urine from the bladder and may address other existing issues.

SUMMARY

The disclosed device is unique when compared with other known devices and solutions because it provides a structurally different device offering an improved visual and tactile cue for opening and closing the catheter. The tactile cue is an important and necessary improvement for visually impaired patients who use a suprapubic catheter. The disclosed device connects to a suprapubic catheter and attaches to an undergarment to provide a discrete wear. The disclosed device aids in reducing risk of infection from a discharge end, provides better mobility to a person using the device, reduces the risk of spills, eliminates splatter while discharging the urine, provides single handed operation, and provides ease of use.

In one or more embodiments, a catheter slide valve attaches to a suprapubic catheter (SPC) and controls urine flow from the SPC. The catheter slide valve includes a stiff tubing with a connection end and a discharge end. The connection end is conical shaped to connect to an external end of a SPC and the discharge end is cut at an angle to allow smooth or splatter free discharge of urine. A slide valve is integrated into the tubing between the two ends s providing control over discharging or stopping urine from the bladder. The slide valve relies on a slide mechanism to open or close an opening in the slide valve. To note, a wearer can use a one-handed operation by pressing into the valve and holding the tubing with two fingers. The valve and associated tubing are transparent so that a user can see whether a housing for the slide valve is in an open position or a closed position and visually cues a person to any urine in the valve or tubing. Additionally, the slide includes two ends wherein a first end is convex and includes a tactile and visual symbol for "closed" and a second end is concave including a symbol for "open." This provides a tactile cue for a visually impaired wearer of a SPC using the catheter, which eliminates the potential of the valve being left in an open position. Additionally, the catheter slide valve device can remain plugged into the external end of the SPC and resides in the wearer's garment using a clip.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

Referring now to the drawings and the following written description of the present invention, it will be readily understood by those persons skilled in the art that the present invention is susceptible to broad utility and application. Many embodiments and adaptations of the present invention other than those described herein, as well as many variations, modifications, and equivalent arrangements will be apparent from or reasonably suggested by the present invention and the detailed description thereof without departing from the substance or scope of the present invention. This disclosure is only illustrative and exemplary of the present invention and is made merely for purposes of providing a full and enabling disclosure of the invention.

The present disclosure is generally directed to one or more non-limiting embodiments of a slide valve device that can attach to a suprapubic catheter. As mentioned above in the background section, a drainage bag is usually attached to the suprapubic catheter, but it can be inconvenient, uncomfortable, and socially awkward. The suprapubic catheter may also be used without a drainage bag, however, there are several issues with the current devices that are attached to the suprapubic catheter. The present disclosure provides the slide valve device which is an improvement over the current devices that can attach to a suprapubic catheter to control the emptying of the bladder. The slide valve device has a visual and tactile cue for opening and closing the catheter. Further details are provided below with reference to the figures. It is to be understood that the present invention will be discussed for use with a suprapubic catheter, however, the slide valve device can be used with any other type of catheter that can benefit from the utility of the slide valve device of the present invention.

Figure 1:
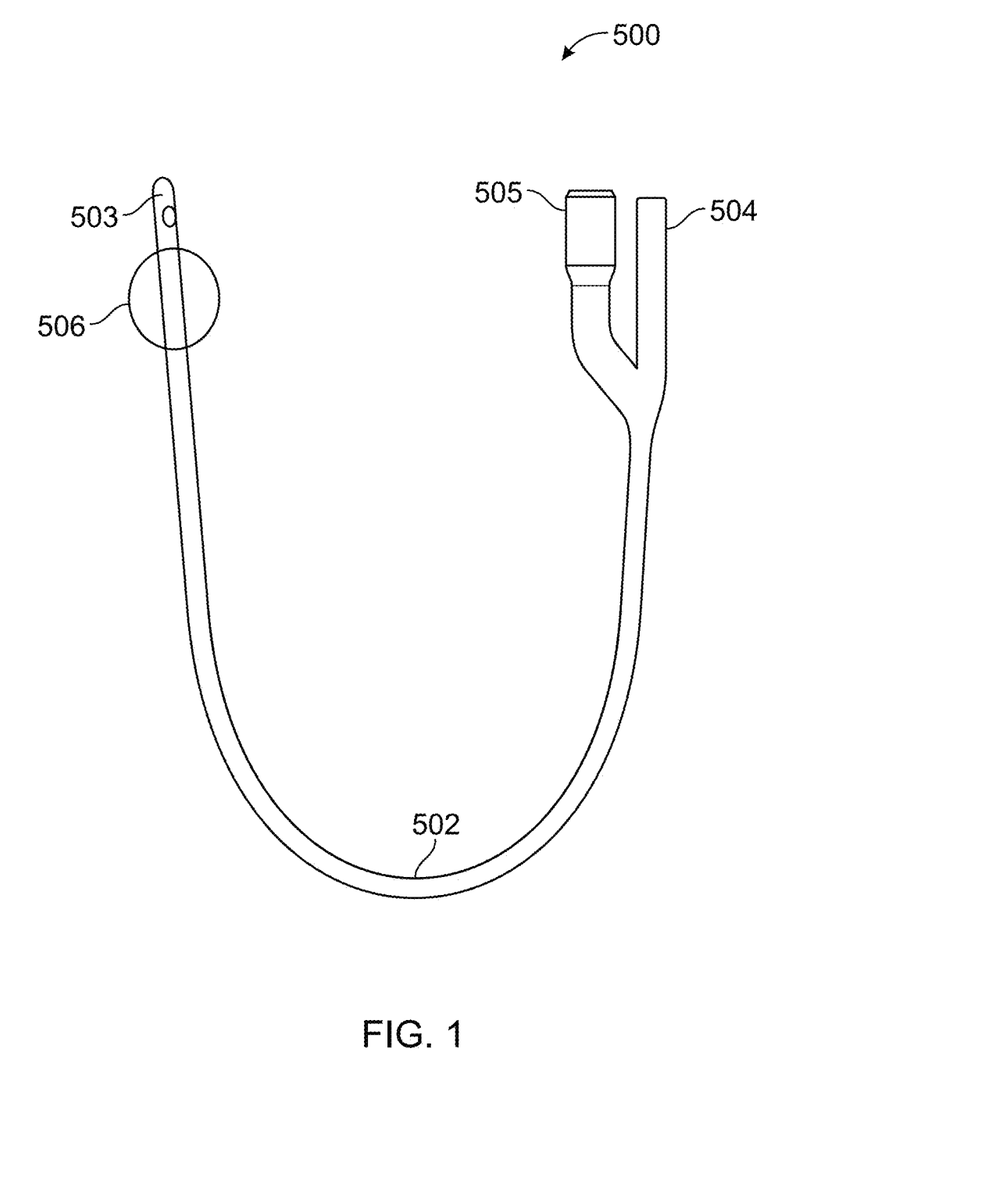
FIG. 1 is a pictorial illustration of a suprapubic catheter valve.
Figure 2:
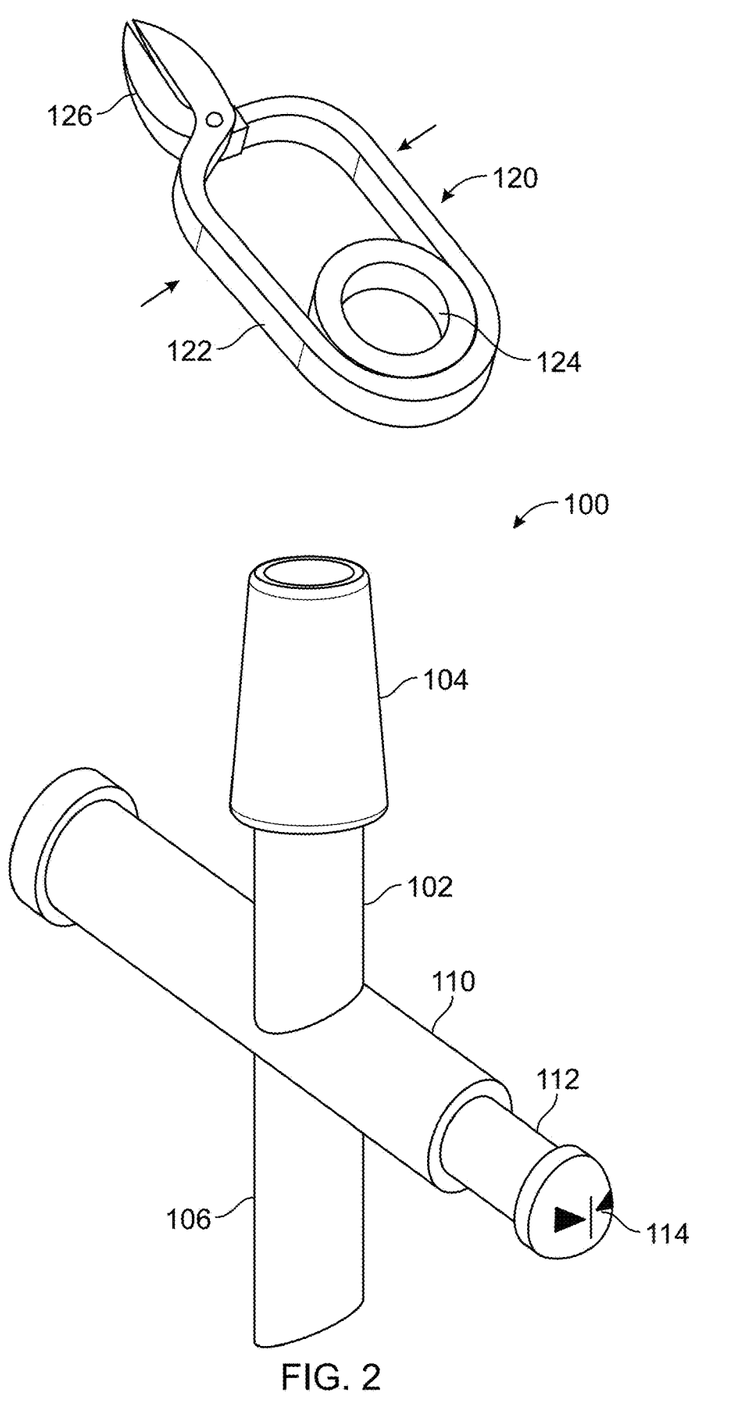
FIG. 2 is a pictorial illustration of a perspective view of a catheter slide valve device and an attachment piece in accordance with an illustrative embodiment.
Figure 3:
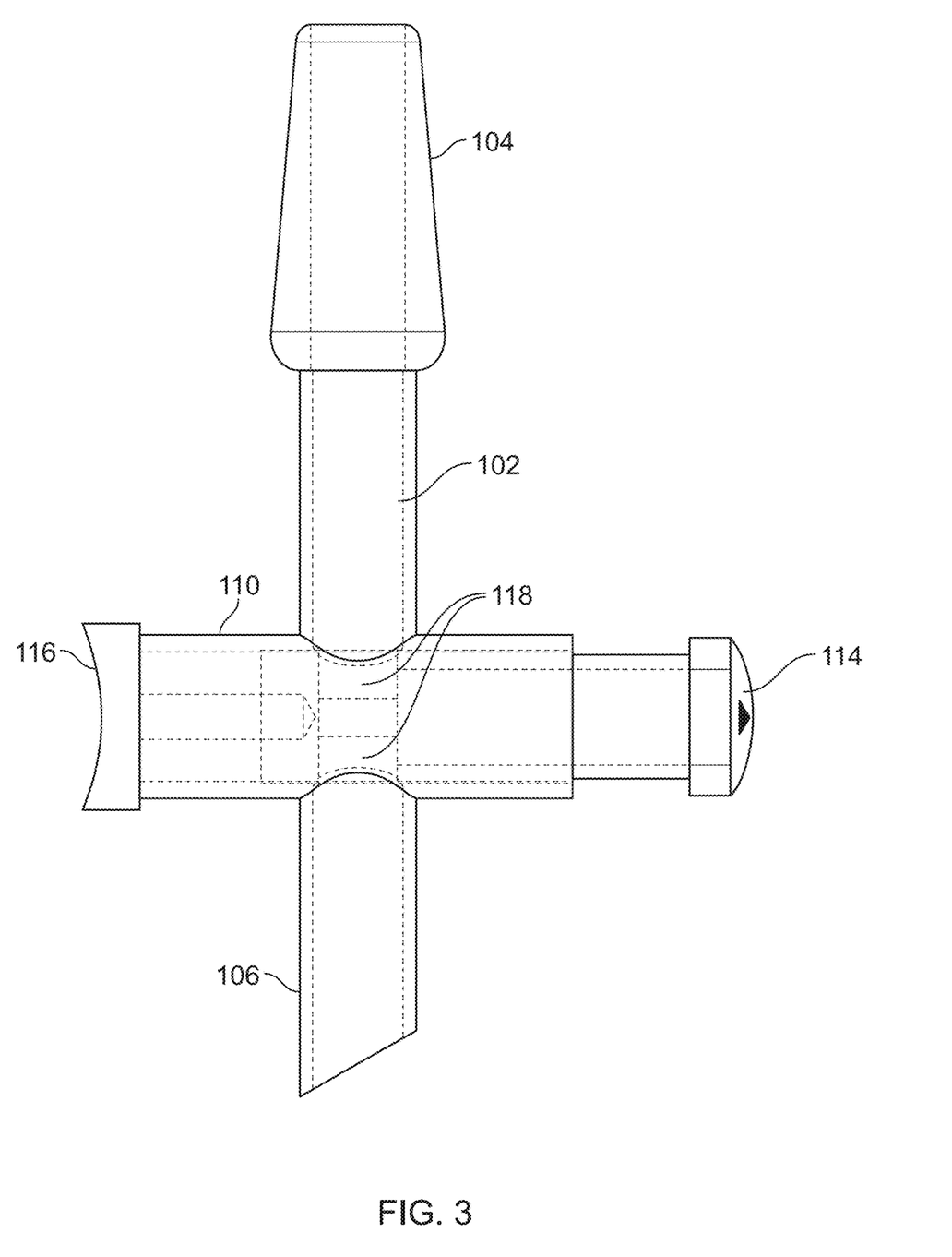
FIG. 3 is a pictorial illustration of a side view of the catheter slide valve to demonstrate a clear appearance of the catheter slide valve in accordance with an illustrative embodiment.

FIG. 1 illustrates an example of a suprapubic catheter 500 that can be inserted into a bladder of an individual requiring such a medical device. FIGS. 2-3 illustrate the slide valve device 100 of the present invention which can connect to the suprapubic catheter 500. Referring to FIG. 1, the suprapubic catheter 500 includes a flexible tube 502 that has an insertion end 503 and an external end 504. As the name suggests, the insertion end 503 is placed inside a bladder and a balloon 506 is filled with water to hold the insertion end in place within the bladder. The external end 504 is connected to a drainage bag. In addition, a sample port 505 is also included which allows a sample to be withdrawn for sampling purposes. The slide valve device 100 of the present invention will connect to the external end 504 of the suprapubic catheter 500.

The slide valve device 100 in the present invention described herein, obviates the need to connect the suprapubic catheter to a drainage bag. The slide valve device 100 is a single integrated device that reduces or eliminates the splattering of fluid when it is used to drain the fluid directly into a toilet or other collection device. The slide valve device 100 also reduces the possibility of contamination as the slide valve device 100 includes a slide mechanism to close an opening and keeping any residual fluid from traveling upward from an end the fluid is discharged from.

Referring to FIGS. 2 and 3, the slide valve device 100 comprises a transparent tube 102 which includes an inlet end 104 and an outlet end 106. As shown in the illustration, the inlet end 104 may be identified as a connection end, or an end that connects with the suprapubic catheter. The inlet end 104 has connection element(s) that allows the inlet end 104 to connect with the external end of the suprapubic catheter. As seen in FIGS. 2 and 3, the connection element of the inlet end 104 is conical shaped and has a diameter slightly larger than the diameter to the tube 102 narrowing at the tip that inserts into the suprapubic catheter. The outlet end 106 may be identified as a discharge end or an end fluid is discharged from. The outlet end 106 has a biased design or a diagonal cut so as to allow a smooth flow of fluid and prevent splattering.

A valve mechanism is included on the tube 102 between the first end 104 and the second end 106. The valve mechanism comprises a valve housing 110 and a slide valve 112. The valve housing 110 with the slide valve 112 is positioned perpendicular to the tube 102. As the name suggests, the slide valve 112 is housed within the valve housing 110, which also serves as a track for the slide valve 112 to slide between positions. Thus, the slide valve 112 closely fits with the valve housing 110 to slide within the valve housing 110.

Referring to FIGS. 2 to 6, the slide valve 112 is shown to have two ends, a first end 114 and a second end 116 opposite the first end 114. The slide valve 112 also includes an aperture 118 corresponding in dimension and open area to a through passage in the tube 102. When the aperture 118 is in line with the through passage in the tube 102, fluid can flow through from the inlet end 104 to the outlet end 106. When the aperture 118 is in line with the through passage, the slide valve 112 is considered to be in an open position. When the aperture 118 is not in line with the through passage, the slide valve 112 is in a closed position. The valve housing 110 has a clear glass like appearance to allow a visual cue to identify whether the slide valve 112 is in the open or closed position.

Figure 5:
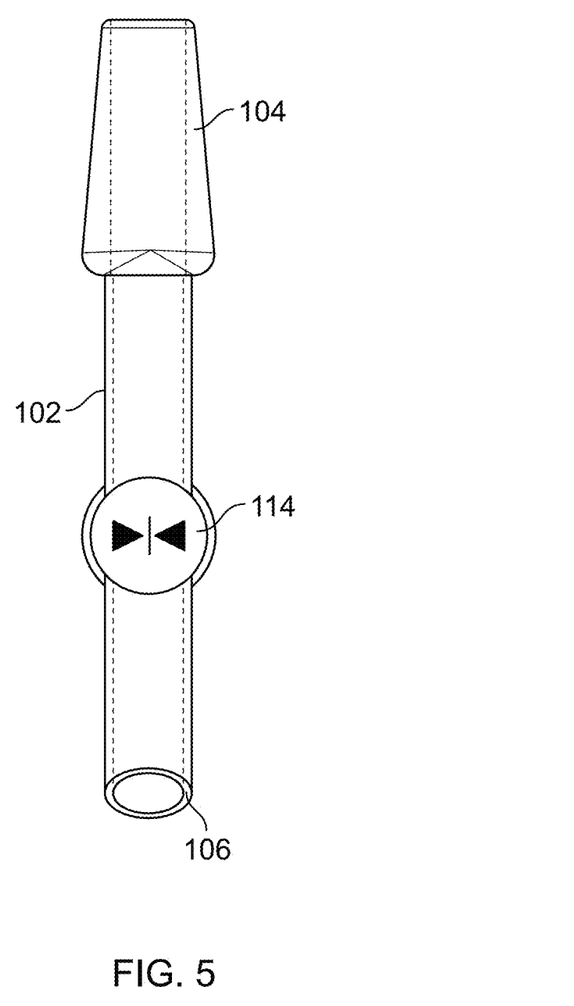
FIG. 5 is a pictorial illustration of the catheter slide valve, highlighting a valve side displaying a closed sign in accordance with an illustrative embodiment.
Figure 6:
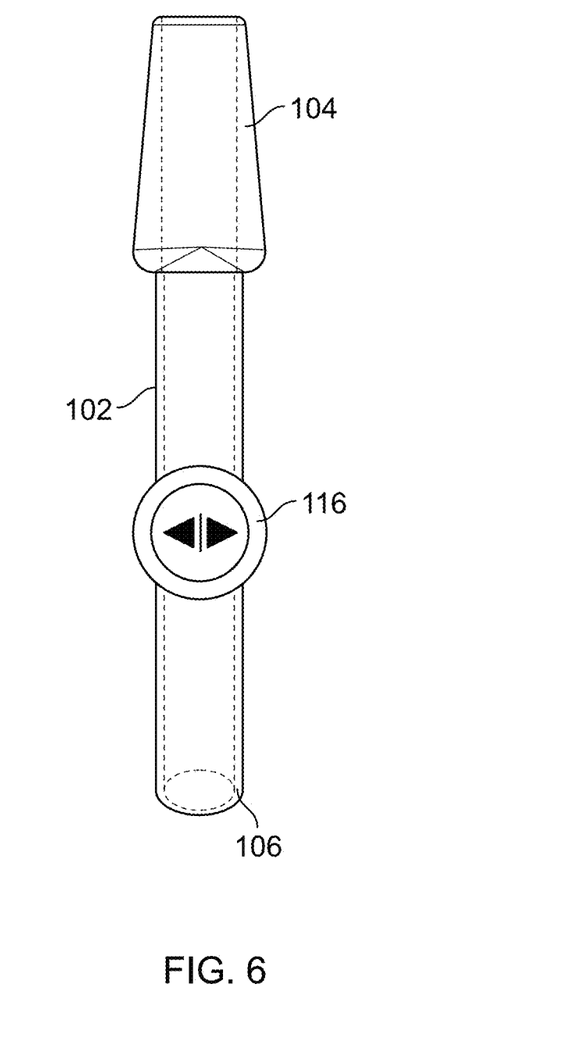
FIG. 6 is a pictorial illustration of the catheter slide valve, highlighting a valve side displaying an open sign in accordance with an illustrative embodiment.

Referring to FIGS. 5 and 6, the opposing slide valve 112 ends 114, 116 are shaped different from each other and intended to be identified by appearance and/or feel. The first end 114 has a convex shape and a tactile symbol for closed ">|<" identifying the closed position for the slide valve 112. Conversely, the second end 116 has a concave shape and a tactile symbol for open "<|>" identifying the open position for the slide valve 112. FIG. 5 illustrates a side view of the slide valve device showing the first end 114 of the slide valve with the closed ">|<" tactile symbol. FIG. 6 illustrates a side view of the slide valve device highlighting the second end 116 with the open "<|>" tactile symbol. The tactile symbols on both ends 114, 116 are raised so that they can be felt by touch and thus provide the tactical sensory cues for the open and closed positions. Thus, when the first end 114, which has the convex shape, is depressed, the slide valve 112 is in the closed position. Alternatively, when the second end 116, which is concave in shape, is depressed, the slide valve 112 is in the open position.

The unique design of the slide valve device 100 incorporates both a visual and sensory cue to identify the slide valve's open and closed positions. The clear glass like valve housing 110 provides a visual cue with the contrasting slide valve 112 solid color which distinguishes between an obvious pathway for fluid flow when in the open position and conversely the closed position. The slide valve 112 also combines both visual and sensory cues with the first and second ends 114, 116 having different shapes and feel, easily identifiable by appearance and feel. The braille symbols also provide an important element missing for visually impaired users.

Figure 4:
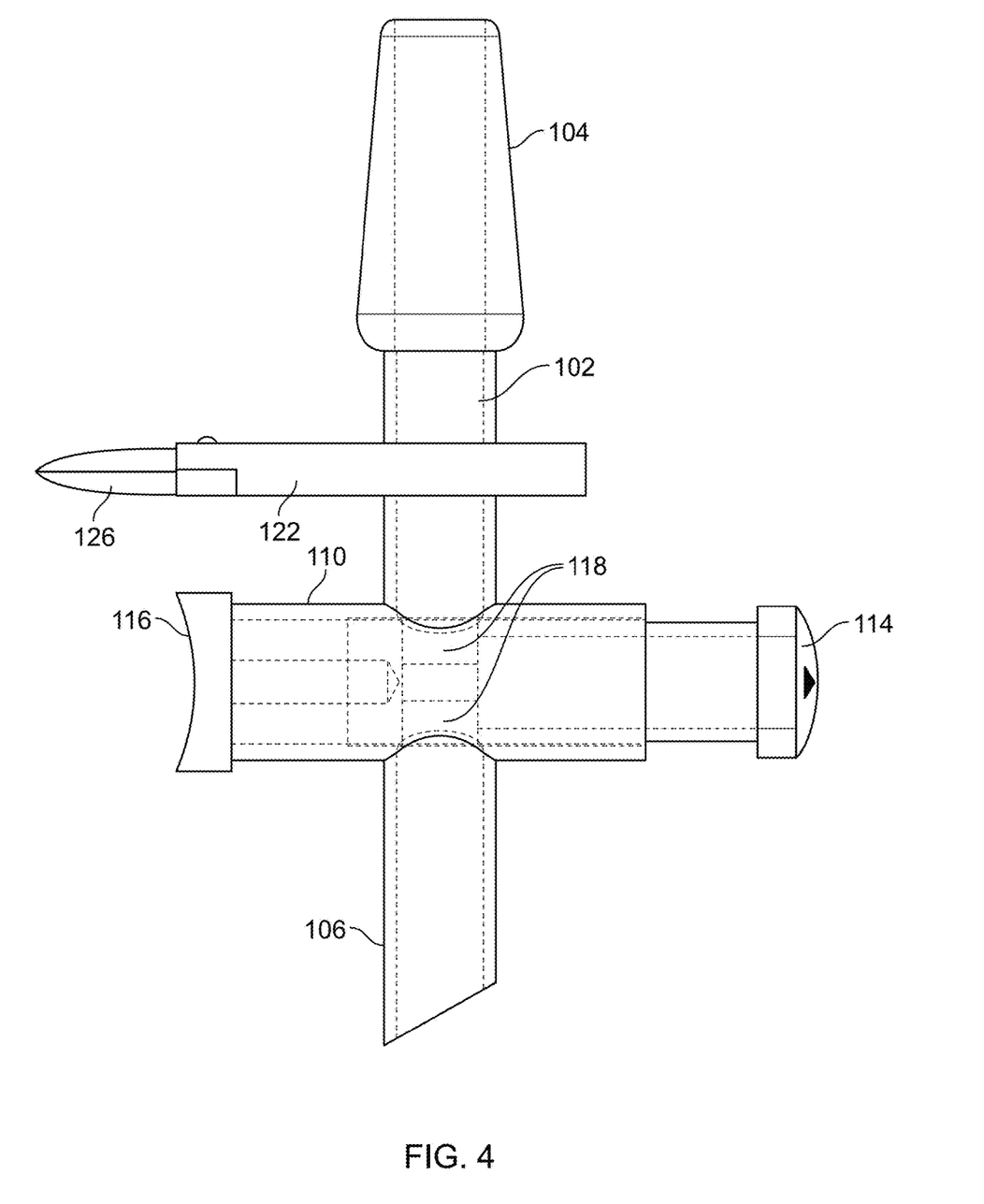
FIG. 4 is a pictorial illustration of a side view of the catheter slide valve with the attachment piece coupled to it in accordance with an illustrative embodiment.

Referring to FIGS. 2 and 4, the slide valve device 100 also includes an attachment piece 120, which is attached to the tube 102 between the inlet end 104 and the valve housing 110. The attachment piece 120 has an attachment end 124 which is a circular ring dimensioned to fit around the tube 102. The attachment piece also includes an end configured with a clip 126 which is opposite the attachment end 124. The clip 126 attaches to a garment, for example, an undergarment. The attachment end 124 is integrated between two arms 122 which are generally squeezed to operate the clip 126. The other end of the attachment end 124 is connected to the clip 126, so that the squeeze pressure on the two arms 122 operates the clip 126. The attachment end 124 has a slight interference fit so it can fit on the tube 102 so as to not fall off and yet at the same time can slide, twist, and turn along a length of the tube 102 between the inlet end 104 and the valve housing 110. The slight interference fit and movement along the length of the tube 102 provides flexibility to the slide valve device 100 when it is connected to a catheter and attached to an undergarment. This flexibility allows for the slide valve device to twist and move to accommodate the wearer's movements, i.e., sitting, standing, kneeling, bending at the waist, or walking.

Figure 7:
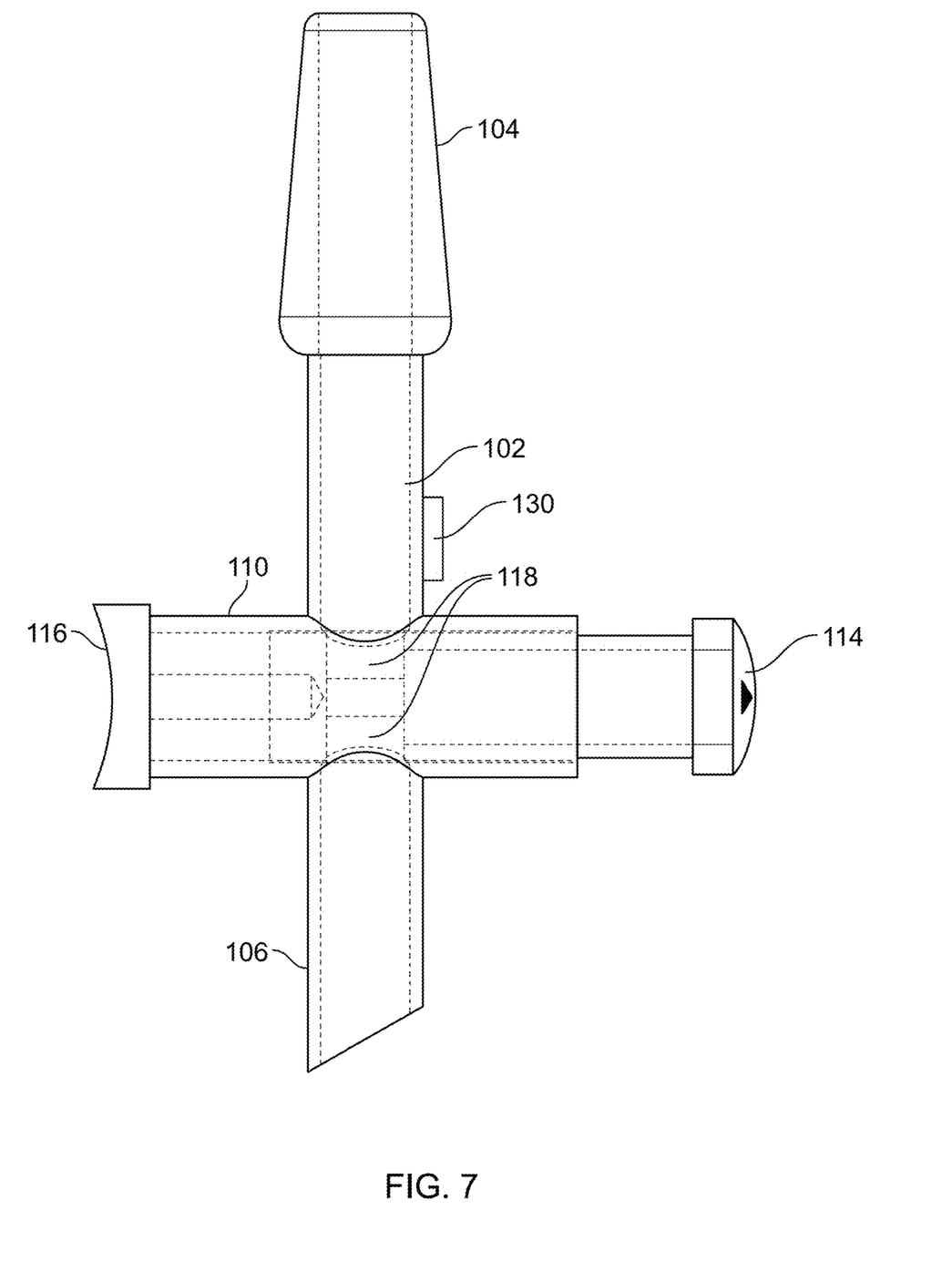
FIG. 7 is a pictorial illustration of a catheter slide valve with a sample port in accordance with an illustrative embodiment.

In an additional embodiment shown in FIG. 7, the slide valve device 100 can incorporate a sample port 130 positioned on the tube 102 between the inlet end 104 and the valve housing 110. This configuration allows for the collection of fluid sample without interrupting the flow through the device. Furthermore, sufficient space is provided on the tube between the sample port 130 and the inlet end 104, allowing for the secure attachment of the attachment piece 120 around the tube 102. This design ensures that the sample port 130 is accessible and functional while maintaining the integrity and operability of the attachment piece 120.

The slide valve device 100 is made from medical-grade materials designed specifically for safe and effective use in medical applications. These materials meet stringent standards for biocompatibility and are suitable for long-term use. The use of medical-grade materials ensures that the slide valve device 100 is safe for patient care and offers reliable performance, making it well suited for its intended purpose of use with catheter systems.

Accordingly, the present description provides for a slide valve device 100 that includes a slide valve mechanism, wherein the slide valve ends include visual and touch cues to identify the valve's open or closed positions. Additionally, the valve housing is clear, and the internal valve has a contrasting solid color to provide an additional visual cue to identify whether the valve is in the open or closed position. The attachment piece is used to attach the valve device to the wearer's clothing and the circular attachment end has an interference fit to slide, twist, and turn along the tubing of the slide valve device to accommodate the wearer's movements. Many uses and advantages are offered by the slide valve device 100 as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A device comprising:
   a tube including a through passage, wherein the tube has an inlet end and an outlet end;
   a valve mechanism including:
      a valve housing perpendicularly configured on the tube between the inlet and outlet ends; and
      a slide valve fitted within the valve housing, the slide valve having a first end and a second end that extend outward from opposite sides of the valve housing, the slide valve having an aperture positioned between the first end and the second end, the aperture having a dimension commensurate with a dimension of the through passage in the tube, wherein the first end of the slide valve has a convex shape and the second end of the slide valve has a concave shape.

2. The device of claim 1, wherein the inlet end is configured with a connection element shaped to connect with an end of a catheter, wherein the connection element is conically shaped, with a diameter that is larger than a diameter of the tube and tapering to a narrower tip to fit with the catheter.

3. The device of claim 1, wherein the outlet end of the tube is diagonally cut to allow for smooth fluid discharge and prevent splattering.

4. The device of claim 1, wherein the valve housing is made from a transparent material, and the slide valve has a solid contrasting color to provide a visual cue indicating whether the slide valve is in an open or closed position.

5. The device of claim 1, wherein the first end of the slide valve includes a tactile symbol indicating a closed position, and the second end of the slide valve includes a tactile symbol indicating an open position.

6. The device of claim 1, wherein an attachment piece is removably or permanently coupled to the tube, wherein the attachment piece is configured to attach to a garment.

7. The device of claim 6, wherein the attachment piece further includes:
   an attachment end configured as a circular ring with an interference fit to allow the attachment piece to slide and twist along a length of the tube; and
   a clip configured to attach to the garment, the clip being operable by squeezing two arms of the attachment piece.

8. The device of claim 1, wherein the slide valve is configured to move between an open and a closed position, and the aperture within the slide valve aligns with the through passage in the tube when the slide valve is in the open position to permit fluid flow.

9. The device of claim 1, further comprising a sample port positioned between the inlet end and the valve housing, allowing for collection of a fluid sample.

10. The device of claim 1, wherein the tube and the valve mechanism are made from medical-grade materials designed for long-term use in medical applications.

11. A device comprising:
   a tube having an inlet end for connection to a catheter and an outlet end for discharging fluid;
   a valve mechanism integrated on the tube, the valve mechanism comprising:
      a valve housing perpendicularly configured to the tube; and
      a slide valve positioned within the valve housing, the slide valve having an aperture that aligns with a through passage in the tube, the slide valve movable within the valve housing between an open and closed position, and the slide valve having two ends that extend outward from opposite sides of the valve housing, wherein the two ends of the slide valve are flanged and each end of the slide valve includes visual and tactile cues for identifying open and closed positions, wherein a first end of the slide valve is convex shaped indicating the closed position, and a second end of the slide valve is concave shaped indicating the open position.

12. The device of claim 11, wherein the valve housing is transparent, and the slide valve has a contrasting color to provide a visual indication of whether the slide valve is in the open or closed position.

13. The device of claim 11, wherein the slide valve is operable with one hand, wherein a user presses on either the first end or the second end of the slide valve while holding the tube with the same hand.

14. The device of claim 11, wherein the slide valve further includes raised symbols on the first end and the second end, wherein the first end includes a symbol for the closed position, and the second end includes a symbol for the open position.

15. The device of claim 11, wherein the inlet end is configured with a connection element shaped to connect with an end of the catheter, wherein the connection element is conically shaped, with a diameter that is larger than a diameter of the tube and tapering to a narrower tip to fit with the catheter.

16. The device of claim 11, wherein the outlet end of the tube is diagonally cut to allow smooth fluid flow and minimize fluid splatter during discharge.

17. The device of claim 11, wherein an attachment piece is removably or permanently coupled to the tube, wherein the attachment piece is configured to attach to a garment.

18. The device of claim 17, wherein the attachment piece further includes:
   an attachment end configured as a circular ring with an interference fit to allow the attachment piece to slide and twist along a length of the tube; and
   a clip configured to attach to the garment while allowing the tube to twist and move with a wearer's movement, the clip being operable by squeezing two arms of the attachment piece for attachment to the garment.

19. The device of claim 11, further comprising a sample port integrated into the tube between the inlet end and the valve housing for fluid sample collection.

20. The device of claim 11, wherein the tube and the valve mechanism are constructed from medical-grade materials for long term use in medical applications.

\* \* \* \* \*